Oct. 18, 1932.  R. L. WILLIAMS  1,883,433
SYSTEM AND APPARATUS FOR SUBMARINE SIGNALING
Filed Sept. 12, 1927
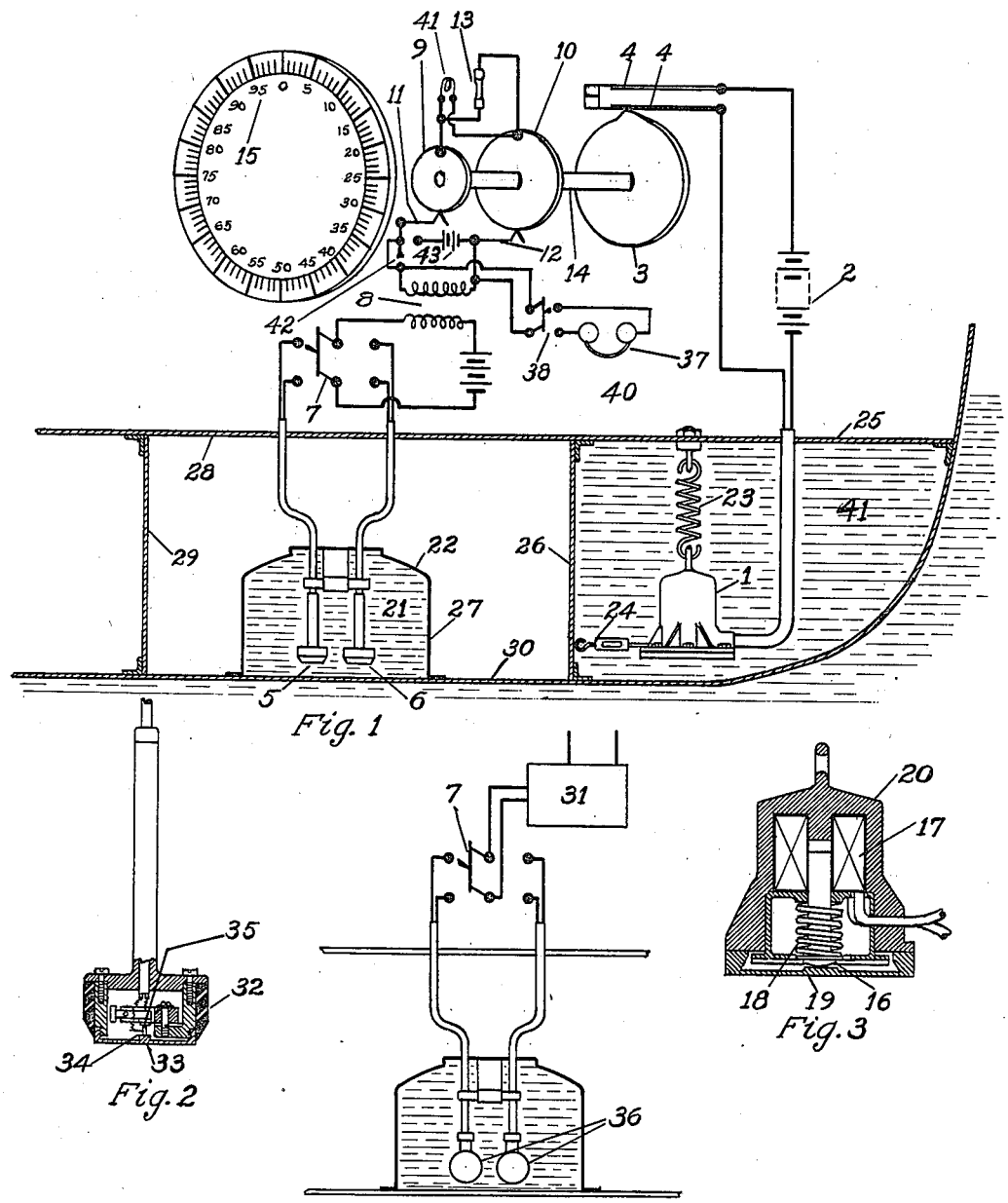
INVENTOR.
Robert L. Williams
BY
Ezekiel Wolf
ATTORNEY.

Patented Oct. 18, 1932

1,883,433

UNITED STATES PATENT OFFICE

ROBERT LONGFELLOW WILLIAMS, OF NEWTON, MASSACHUSETTS, ASSIGNOR TO SUBMARINE SIGNAL CORPORATION, OF BOSTON, MASSACHUSETTS, A CORPORATION OF DELAWARE

SYSTEM AND APPARATUS FOR SUBMARINE SIGNALING

Application filed September 12, 1927. Serial No. 219,002.

The present invention relates to a system in submarine signaling wherein both receivers and senders may be operative at the same time, and in particular to the means employed for protecting the receiving apparatus from any harmful effects of the particular type of sending apparatus employed.

This invention has particular merit in systems for the measurement of depths and distances wherein it is desired to maintain the receiving circuit and apparatus in a sensitive condition and still be able to avoid a shock which might be produced by the sudden impact of the signal emitted into the water. It will be appreciated that in order to measure shallow depths in depth sounding by the aid of the time of travel method, it is essential to keep the receiving apparatus in sensitive and receiving condition practically all the time. Devices which open the circuit to the indicating apparatus are helpful to some extent in preventing a shock to the circuit of the system, but such devices cannot, of course, prevent the receiver itself from being shocked where the latter is connected through some sound transmitting channel directly to the sending apparatus. In order to prevent the receiving apparatus from being shocked, sound screens have been used which have been placed near the receiving apparatus or between the sending and receiving apparatus. Such methods of sound insulation help to protect the receiving apparatus from the sound transmitted through the water and are effective to that extent.

I have discovered, however, that in addition to the above mentioned source of disturbance to the receiving apparatus proper, a good deal of disturbance comes from shocks and vibrations not transmitted from the sender to the receiver through the water but through the suspensions of the sending and receiving apparatus. This disturbing effect I have overcome in an exceedingly simple manner by the use of proper sound insulating mechanism for the suspension of the sound emitter. While the suspension of the sound receiver by proper sound insulating means is of some assistance, it is not nearly as effective as the suspension of the sound producer, since the sound energy otherwise transmitted to the surrounding walls is of such a large magnitude that, even though the receiver is suspended by an almost perfect insulator, which condition is practically impossible, and only a small percent of the sound gets through the insulating suspension, this small percent has often more energy than the signal or echo to be received.

Then again, after the shock has been transmitted through the suspension of the sending device, if it is not a sound insulator, the walls of the vessel will take up the sound and, if the receiver is in a tank for instance, may transmit the sound through the wall of the tank to the receiver directly through the water in the tank. In this way the receiver may be affected even though it has an insulating suspension.

While the present invention has been shown below in connection with a depth sounding system, to which it has a particularly useful and meritorious application, it will be appreciated that it has other useful applications in the art of submarine signaling.

In the embodiment described in the following part of the specification, particular reference is had to the drawing in which Figure 1 shows somewhat diagrammatically the system employing my invention;

Figure 2 shows the type of receiver which is preferably used;

Figure 3 illustrates the detail of the sending apparatus and

Figure 4 shows a modification employing a somewhat different receiving and indicating system than shown in the other figures.

As indicated in Figure 1, the apparatus is installed upon a vessel, 40, which may be considered as floating upon the water or immersed therein. The sound producer, 1, is immersed in a tank, 41, filled with water, and likewise the sound receivers, 5 and 6, which are immersed in the water filled tank, 21.

In Figure 1 the sound is emitted as an impact by the sounder 1 at times when the cam 3 closes the contacts 4. 4 through the energizing source 2, which in this case is a battery. At the same time, either the receiver 5 or 6 may be connected through the switch 7, by throwing the blade to the right or left, to the indicating device through the transformer 8, the output of which is represented as connected to the slip rings 9 and 10 by means of the brushes 11 and 12 respectively. In the operation of the system, the switch 7 is left in a position connecting one of the receivers to the indicator so that the receiving system is always operating.

The signal emitted travels to the reflecting surface or object and is returned as an echo or otherwise to the receiving system.

In the entire system where distances are to be measured the elements 3, 9, and 10, together with the flashing indicator 13, rotate synchronously on the shaft 14 behind the transparent scale 15 graduated in the units desired to be measured. The signal being emitted at the same point on the scale, at the zero point for instance, the angular travel of the indicator 13 will indicate a measurement on the scale 15.

The device preferably employed in the present system is an impact striker shown in Figure 3 in detail. Here the energy is imparted to a striking hammer, 16, by means of a solenoid, 17, which draws the hammer 16 against a powerful spring, 18, thereby compressing the latter. When the contacts 4. 4 are opened, the hammer is released and the spring forces it with a powerful thrust against the diaphragm, 19, which emits an impact sound of great intensity.

The powerful thrust of the hammer, 16, must be balanced by the casing, 20, supporting the diaphragm. The pull on the casing in turn is taken up by the supporting structure which supports the sounding mechanism. If this structure were rigid, a substantial part of the sound energy due to the impact would be transmitted to the walls of the vessel, to the tank, 21, the tank wall, 22, and the interior structure and frame. It is for this reason that I employ a spring, 23, which not only absorbs some of this impact energy from the sound emitter but also changes its characteristics with regard to frequency and the like so that the receivers are practically sound insulated from this source of disturbance. The sounder is also supported by the rods, 24, to prevent any sidewise movement and the striking, in the rolling of the boat, of the sides of the tank.

By suspending the striking mechanism in this fashion, it will no doubt now be appreciated that a good deal of the disturbing sounds which otherwise would be passed to the frame structure marked 25, 26, 27, 28, 29 and 30 would be excluded and that as a consequence a good deal of the impact affecting the receivers 5 and 6, traveling through the outer water into the tank, 21, and through the tank frame, 27, directly through the tank water to the receivers, will be avoided. The results gained by this method of sound insulation of the sound emitter substantiate the theory discussed above and make it possible to use a relay type of receiver, as will be explained later, with a sounder of the impact type.

While a microphone may be used as indicated in Figure 4 where 36 represents the microphones connected through the switch 7 to an amplifying relay, 31, or the like, which connects through the transformer 8 to the indicator 13, nevertheless the present improvement has even greater merit and application where a relay 32 is used as a receiver, as shown in Figure 2.

In connection with the use of the microphones 36 for receiving purposes, or even with the receivers 5 and 6, the switch 38 may be closed and the signal observed by listening with the telephones 37 as well as visually by watching the indicator 13.

To complete the system for depth finding, the continuous luminous indicator 41 may be continuously illuminated by the switch 42, being thrown to the right to connect in circuit the battery 43. The position of the indicator 41 when the echo is heard in 37 will give the depth. As the system may be used with a listening device such as a telephone 37, I prefer to have the characteristic frequency of the spring 23 below the period of audibility, so that whatever vibration of the spring which occurs in operating the emitter 23 could not possibly be heard in the telephone 37.

The relay 32 is discussed in my copending application, Serial No. 750,218, filed November 15, 1924. Briefly described for the purposes of the present application, it comprises a diaphragm 33 on which is mounted a conducting contact 34, which normally just makes contact with a second balanced contact 35, balanced very sensitively above the contact 34. While an excessive jar may not necessarily injure the instrument, nevertheless it is quite possible to give the balanced contact such a large amplitude of motion that it will not return to normal operating condition for an appreciable time. In this manner, a series of false indications may be given for a considerable time.

On examination of the system of the present invention, it should be noted that the minimum depth of water which can be measured depends almost entirely upon how quickly the receivers can get back to normal condition after the direct sound has been emitted. If the echo of the direct signal returns to the receiver while the latter is still recovering from excitation directly by the sender, the echo cannot be distinguished from the direct signal. Since the velocity of sound in water is about 4800 feet per second, it will be appreciated that the time intervals involved are of the order of 1/1000 of a second and that refinements of the type herein described are of utmost importance for good observations and measurements.

Having described my invention, I now claim:

1. In a signaling system in a vessel for both sending and receiving signals substantially at the same time, a sound producer of the impact type having a diaphragm adapted to produce a sound impulse by action of a force in a direction substantially perpendicular thereto, a water filled tank located in said vessel and means within said tank for supporting said sound producer in the direction of the action of said force at the diaphragm, said means being yielding in said direction.

2. In a signaling system in a vessel for both sending and receiving signals substantially at the same time, a sound producer of the impact type having a diaphragm adapted to produce a sound impulse by action of a force in a direction substantially perpendicular thereto, a water filled tank located in said vessel and means for suspending said sound producer from the roof of said tank including spring means acting in the direction of said force.

3. In a signaling system in a vessel for both sending and receiving signals substantially at the same time, an impact sound producer, a water filled tank within said vessel and means for suspending said sound producer from the top thereof comprising a helical spring and means for attaching said spring to the top wall of said tank.

4. In a signaling system in a vessel for both sending and receiving signals substantially at the same time, an impact sound producer, a water filled tank within said vessel and means for suspending said sound producer from the top thereof comprising a helical spring, means for attaching said spring to the top wall of said tank and means for supporting said sound producer from the side of said tank.

In testimony whereof I affix my signature.
ROBERT LONGFELLOW WILLIAMS.